(12) United States Patent (10) Patent No.: US 8,752,185 B2
Menon et al. (45) Date of Patent: Jun. 10, 2014

(54) METHOD FOR MEDIA FINGERPRINTING

(75) Inventors: Satish Menon, Sunnyvale, CA (US); Malcolm Slaney, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1411 days.

(21) Appl. No.: 12/113,893

(22) Filed: May 1, 2008

(65) Prior Publication Data

US 2009/0276468 A1 Nov. 5, 2009

(51) Int. Cl.
| | |
|---|---|
| *H04L 29/06* | (2006.01) |
| *G06F 17/30* | (2006.01) |
| *G06F 11/10* | (2006.01) |
| *G06F 21/14* | (2013.01) |
| *G06F 21/64* | (2013.01) |
| *G06F 21/10* | (2013.01) |
| *H04L 9/06* | (2006.01) |
| *H04L 9/32* | (2006.01) |
| *G06Q 30/00* | (2012.01) |

(52) U.S. Cl.
CPC ........ *G06F 17/3002* (2013.01); *G06F 11/1004* (2013.01); *G06F 17/30784* (2013.01); *G06F 17/30743* (2013.01); *G06F 21/10* (2013.01); *G06F 21/14* (2013.01); *G06F 21/64* (2013.01); *H04L 9/0643* (2013.01); *H04L 9/3223* (2013.01); *H04L 2209/16* (2013.01); *G06Q 30/00* (2013.01); *G06Q 2220/10* (2013.01); *G06Q 2220/16* (2013.01)
USPC .............. 726/26; 726/1; 726/2; 726/3; 726/4; 726/27; 726/28; 726/29; 726/31; 726/32; 726/33; 713/176; 713/177; 713/179; 713/180; 713/181; 705/51; 705/57; 705/59

(58) Field of Classification Search
CPC ......... G06F 21/06; G06F 21/10; G06F 21/12; G06F 21/14; G06F 21/16; G06F 21/30109; G06F 17/30743; G06F 17/30784; G06F 11/1004; H04L 9/0643; H04L 9/32; H04L 45/7453; H04L 2209/38; H04L 2209/16; G06Q 20/3825; G06Q 20/3827
USPC .......... 726/16, 17, 26–33, 1–4; 713/187, 161, 713/164–167, 176–181; 709/224; 705/50–59
See application file for complete search history.

(56) References Cited

U.S. PATENT DOCUMENTS

| | | | |
|---|---|---|---|
| 8,094,872 B1 * | 1/2012 | Yagnik et al. ................. | 382/100 |
| 2003/0191942 A1 * | 10/2003 | Sinha et al. ................... | 713/181 |
| 2004/0220975 A1 * | 11/2004 | Carpentier et al. ........... | 707/200 |

(Continued)

OTHER PUBLICATIONS

Detecting and Tracing Copyright Infringements in P2P Networks by Mee et al; Publisher: IEEE; Year: 2006.*

(Continued)

*Primary Examiner* — Madhuri Herzog
(74) *Attorney, Agent, or Firm* — Hickman Palermo Truong Becker Bingham Wong LLP

(57) ABSTRACT

A method of checking whether a content aggregator's content matches a content owner's content involves generating a fingerprint of the content and looking for a matching fingerprint from the content owner through a service provided by the content owner. In one aspect, the fingerprints are generated from an intermediate digest of the content instead of the original form.

22 Claims, 3 Drawing Sheets

(56) References Cited

U.S. PATENT DOCUMENTS

| | | | |
|---|---|---|---|
| 2005/0154608 A1* | 7/2005 | Paulson et al. | 705/1 |
| 2005/0172312 A1* | 8/2005 | Lienhart et al. | 725/19 |
| 2006/0005252 A1* | 1/2006 | Chu et al. | 726/26 |
| 2008/0040807 A1* | 2/2008 | Lu et al. | 726/26 |
| 2008/0071617 A1* | 3/2008 | Ware | 705/14 |
| 2008/0155116 A1* | 6/2008 | Schmelzer | 709/232 |
| 2009/0083228 A1* | 3/2009 | Shatz et al. | 707/3 |
| 2009/0089337 A1* | 4/2009 | Perlin et al. | 707/200 |
| 2009/0138486 A1* | 5/2009 | Hydrie et al. | 707/10 |
| 2009/0144325 A1* | 6/2009 | Chastagnol et al. | 707/104.1 |

OTHER PUBLICATIONS

Avery Li-Chun Wang, Shazam Entertainment, Ltd., USA, Palo Alto, CA, United Kingdom, London, "An Industrial-Strength Audio Search Algorithm", seven (7) pages.

Kunio Kashino et al., Member IEEE, "A Quick Search Method for Audio and Video Signals Based on Histogram Pruning", IEEE Transactions on Multimedia, vol. 5, No. 3, Sep. 2003; 1520-9210/03 copyright 2003 IEEE, pp. 348-357.

Shazam Entertainment, "ISMIR 2003", Oct. 29, 2003, copyright 2003 Shazam Entertainment, Ltd., thirty-nine (39) pages.

Webpage—http://en.wikipedia.org/wiki/Digital_video_fingerprinting, "Digital Video Fingerprinting", From Wikipedia, the free encyclopedia, two (2) pages.

\* cited by examiner

METHOD FOR MEDIA FINGERPRINTING

BACKGROUND

1. Field of the Invention

Aspects of the present invention relate generally to the detection of unauthorized content residing on content aggregators' systems.

2. Description of Related Art

As technology improves, the creation and modification of content is becoming more common and content aggregators are constantly struggling to ensure that the content they are receiving and providing is free from various intellectual property concerns (e.g., copyright, etc.). Currently, the majority of the proposed and practiced solutions to this problem generally involve the content owner handing its content over—in its entirety—to the content aggregator so that the aggregator can compare it in some automated fashion to other content they are already offering. As will be appreciated, the content owners are generally reluctant to send their original and pristine content to the content aggregators (i.e., they would like to maintain as much control over the content as possible).

Of the methods that do not require content owners to upload their original content to the content aggregators for analysis, it is generally required that they create multiple "fingerprints" (or something similar), each according to a process outlined by one of the content aggregators; indeed, a content owner may be required to create as many fingerprints as there are content aggregators that they want to have check their content. The content owners are then generally required to send these fingerprints to the content aggregators so that they may check them against the content they have received from end users.

Thus, it would be desirable to define a method that does not require the content owners to send their content (original or otherwise) to the content aggregators, or to at least minimize the number of fingerprints (or something similar) the content owners must create for each of their original media objects.

SUMMARY

In light of the foregoing, it is a general object of the present invention to enable content aggregators to check various content owner databases to determine whether they are delivering content they do not have permission to share, and in a way that does not require the content owners to send their content to the content aggregators. It also is a general object of the present invention to minimize the number of transformations a content owner needs to make of its content before it can be checked against various content aggregators' content.

BRIEF DESCRIPTION OF THE DRAWING FIGURES

DETAILED DESCRIPTION

Figure 1:
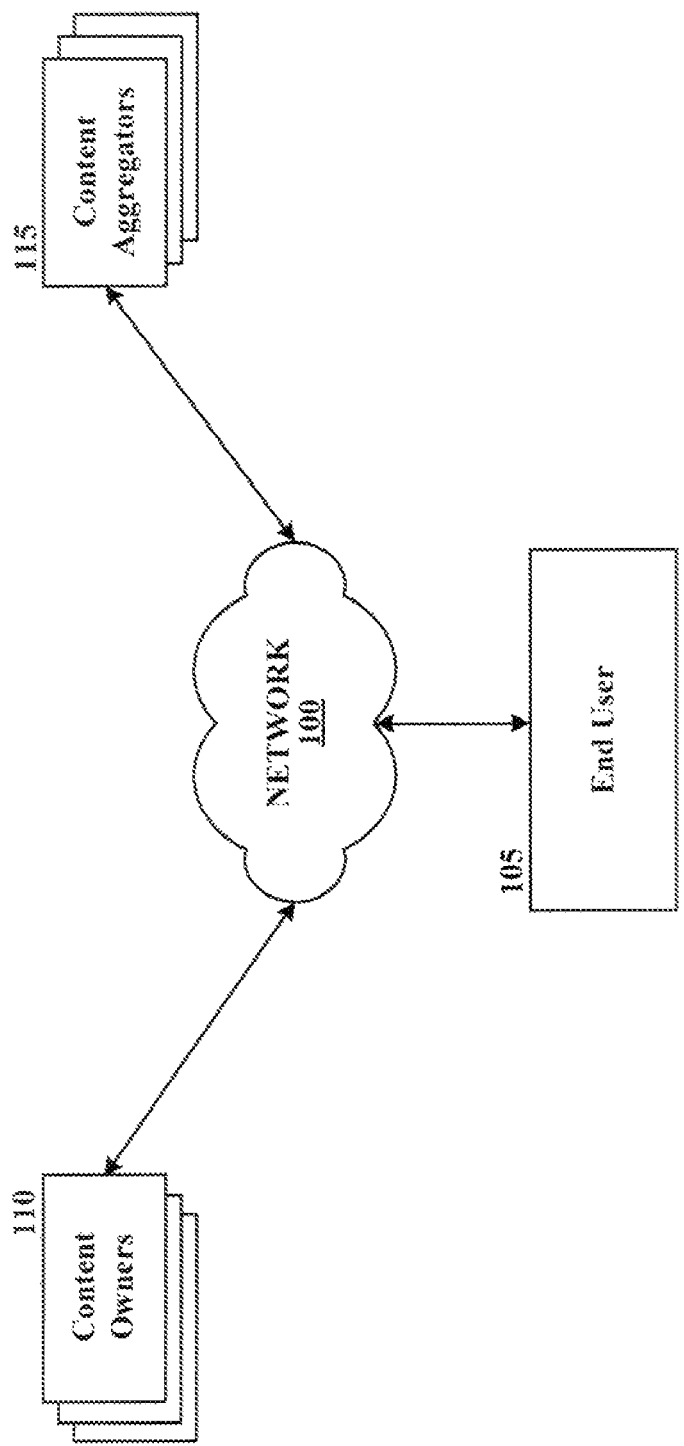
FIG. 1 is a functional block diagram of the general architecture of an exemplary embodiment of the present invention.

Detailed descriptions of one or more embodiments of the invention follow, examples of which may be graphically illustrated in the drawings. Each example and embodiment is provided by way of explanation of the invention, and is not meant as a limitation of the invention. For example, features described as part of one embodiment may be utilized with another embodiment to yield still a further embodiment. It is intended that the present invention include these and other modifications and variations.

Aspects of the present invention are described below in the context of detecting unauthorized content being sent to content aggregators, without requiring the content owners to send their original content to the content aggregators for analysis.

Throughout this disclosure, reference is made to "content," which is used to denote various forms of media, which generally are uploaded by end users to content aggregators (as described below). Such media may include audio, video, images, and any combination thereof.

Throughout this disclosure, reference is made to "content aggregator," which is used to denote a site or service that provides user-uploaded content for consumption by other users of the site/service. Examples of content aggregators include Yahoo! Video™, YouTube™, etc., but they need not be limited to such large-scale operations and can indeed be sites that provide mainly services other than video-sharing, such as, for example, a web-hosting company that allows its users to embed media in their blogs (or otherwise make such content available for download).

Throughout this disclosure, reference is made to "content owner," which is used to denote the legal owner of the content being disseminated by the content aggregator (e.g., a movie studio that owns the intellectual property rights in its latest movie).

FIG. 1 is a functional block diagram of the general architecture of an exemplary embodiment of the present invention. Generally, the system comprises content aggregators 115, content owners 110, and end user 105, and it will be appreciated that content aggregators 115 and content owners 110 may comprise one or more machines, one or more databases, etc., as needed by the respective entity. End user 105 is a person who uploads content to the content aggregators (and who consumes content through the content aggregators), and network 100 (e.g., the Internet, etc.) is the medium over which end user 105, content aggregators 115, and content owners 110 communicate.

Keeping in mind the goal of not requiring the content owners to provide their content—in its complete or usual form—to various content aggregators, it still must be made available in some form so that it may still be checked against the content the content aggregators are making available to end users.

As is known in the art, such a format may comprise a 'description' of the content, also known as a "fingerprint." Currently, there exist many different fingerprinting approaches, each with its own advantages and disadvantages. Generally, the fingerprint representation should be robust and immune to basic transformations that are inherent in the communications and/or editing paths; to this end, information important to the content's signal and its recognition by users (e.g., peaks, edges, etc.), should usually be captured by the fingerprint. Though some examples are given below, it will be appreciated that there are myriad and often very different ways of generating a fingerprint for various types of media, and that the way in which this is done is not critical to the invention.

For example, and in the context of an audio stream (e.g., MP3, WAV, etc.), one approach is to compute a spectrogram of the audio signal, which is a two-dimensional representation of sound that displays energy as a function of time and frequency. From the spectrogram, all of the local peaks (which usually carry much of the useful information) can be found, and these peaks will form a 'constellation' of significant points in the audio signal, such that if they were taken out of the audio signal, the resulting signal likely would not be perceived by human ears the same way as the original audio signal.

In the context of video fingerprinting, color histograms may be used to generate a fingerprint of the video. A color histogram generally counts the number of pixels in an image—regardless of their position—that belong to one of a set of various color "bins" (e.g., a mostly red bin, a mostly green bin, and a mostly blue bin, etc.). With this information, a fingerprint may be generated by looking at the histogram as a function of time.

Irrespective of the algorithm used to create the fingerprint from the original content, the problem remains that content owners must run multiple, different algorithms on their content, and then send the resulting fingerprints to the various content aggregators. To ease the effort required by content owners, a system is defined here such that content owners store the fingerprint and associated information (as described below) on their end, but make it available to the various content aggregators who wish to check their content against it. In such a system, the content aggregators, either upon receiving new content, or at regular intervals, may check the various content owners' content repositories (e.g., databases, etc.) to see if the fingerprints they have generated match any of the fingerprints available from the content owners.

It will be appreciated that the fingerprint(s) and associated information can be stored and made available by the content owners in a variety of different ways. For example, a content owner may offer a web service for interacting with it; generally, the web service may comprise an Application Programming Interface (API) through which the content aggregators and content owners may talk to each other and exchange information. The operation and purpose of web APIs are well known in the art. Briefly, however, and much like any API, a web API is an interface to some service (e.g., a database containing the content owners' fingerprint information) running on a remote system and accessed over a network. Various, sometimes overlapping methods and protocols exist for implementing web APIs, such as, for example, Simple Object Access Protocol (SOAP), Representative State Transfer (REST), XML-RPC, etc., and most use variations of Extensible Modeling Language (XML) data formats for messaging (i.e., transferring data between the web service and the local application).

To flesh out the web services example, consider an eXtensible Markup Language (XML) file, which may be retrieved by the content aggregators through a web service provided by the content owner. The file may contain the fingerprint itself and various associated information ("fingerprint data"), such as, for example, the title of the content, the content owner's name, the owner's contact information, information describing the fingerprint and how it was created (e.g., which of the content aggregators' algorithms was used to create it), etc.

For example, if an algorithm used by the content owner to create the fingerprint is defined by a particular content aggregator, then the fingerprint data may include information pertaining to that content aggregator and the algorithm used (e.g., "Yahoo! Video™ video fingerprint algorithm v3.1"). If a content owner uses its own fingerprint algorithm, or an intermediate digest (which can be thought of as an overly-detailed fingerprint, as detailed below), then the fingerprint data may be more informative, and may include specific information regarding the content owner's method for generating the fingerprint or the intermediate digest, and how the content aggregators may implement the method to check their content against the published information (e.g., the content owner may make available an executable program that the content aggregators can use to generate an intermediate digest, etc.).

It may be the case that a content aggregator can convert one fingerprint to another. For example, if content aggregator A searches a particular content owner's content repository and sees that the content owner provides a fingerprint that was generated using content aggregator B's fingerprint algorithm, content aggregator A may be able to translate its generated fingerprint into a fingerprint that accords with one that was originally generated using content aggregator B's fingerprint algorithm. Such a conversion is predicated on, among other things, content aggregator B's fingerprint algorithm being made available to content aggregator A, and the domains being amenable to conversion (i.e., the fingerprint algorithms may be so different as to make conversion impossible).

Consider an example conversion where one fingerprint algorithm looks at areas of high transition, while another looks at the peaks in the representation (e.g., spectrograms, interest points, etc.). The fingerprints generated by such algorithms can be transformed between each other by first reconstructing the original waveform, and then calculating the other representation from the reconstructed waveform. Accordingly, the points of high transition can be thought of as zero-crossing data, and the peaks in the representation as the location of the waveform when the first derivative goes through zero, and as is known in the art, there exist algorithms for reconstructing a band-limited waveform from zero-crossing data. Such algorithms are generally iterative, and assume that the data is band-limited; the assumption is valid because the creation of an image implies a band-limited sampling operation, and furthermore, the spectral decomposition needed for image and audio analysis provides a second band-limiting operation.

It will be appreciated that the file(s) or other storage mechanism containing the fingerprint and associated data may contain such information for more than one content aggregator/algorithm. For example, if the content owner wishes to have Yahoo! Video™ and YouTube™ check their content for possible illegal content, then, in the case of the XML file example, the file may contain two fingerprint elements, one describing the fingerprint created using the Yahoo! Video™ algorithm, and one describing the fingerprint created using the YouTube™ algorithm. In such a case, when either Yahoo! Video™ or YouTube™ receives a new video, the associated fingerprint generated by the particular content aggregator (or some other identifying information, such as, for example, the title of the content as uploaded) may be searched for in the various content owner databases.

The way in which the content aggregator searches for its content on content owners' systems depends on the services provided by the individual content owners, the information the content aggregator currently has regarding the content it wishes to check, the way in which the content owners store and make available information regarding the content they own, etc., and it will be appreciated that such constraints are not critical to the invention. For example, if an end user uploads new content to a content aggregator and gives it a title, it may make sense for the aggregator to first search the various content owner databases by the title (before running a search on the fingerprint it generates from the content), to see if a content owner claims to own content with that title, and if so, whether there is a fingerprint available that was created using the fingerprint algorithm provided/used by the content aggregator. However, it may be that a particular content owner "tells" the content aggregator that searching by title alone is insufficient (because it may feel that this sort of check is easily circumvented by the end user simply giving the content a false title), in which case the content aggregator may be forced to use the generated fingerprint as an index into the database.

Figure 2:
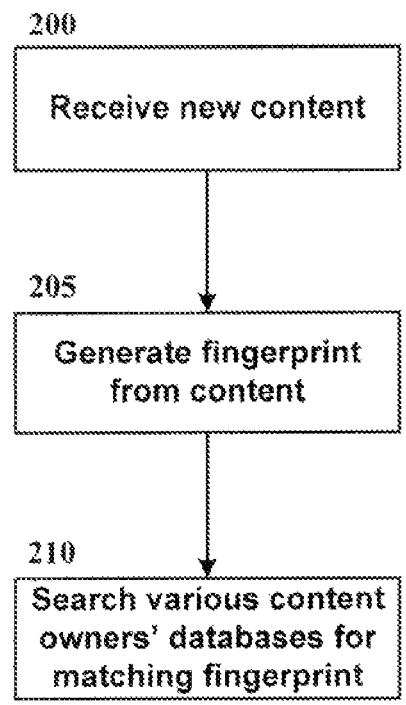
FIG. 2 is a logical flowchart of the general process by which a content aggregator may check its content against various content owners' content repositories.

FIG. 2 is a logical flowchart of the general process by which a content aggregator may check its content against content residing on various content owners' systems. At block 200, a content aggregator receives new content from an end user (i.e., the end user has just uploaded new content to the site/service run by the content aggregator). At block 205, the content aggregator generates a fingerprint of the new content and stores with this fingerprint, various other fingerprint data (e.g., the title the end user gave it, its runtime, its size, etc., as discussed herein). As illustrated at block 210, the content aggregator then searches the database of each of the content owners with which it has established a relationship (or which simply makes its database freely available) for a similar fingerprint (as discussed herein).

As discussed, there are currently myriad vendor technologies available to generate the fingerprints, and these are generally closed and proprietary to a single content aggregator, especially where the content aggregator requires the content owners to send their original and pristine content to it. However, even when they are not entirely closed (e.g., if a content aggregator adopted the method outlined above, it obviously must share its fingerprint algorithm(s) with the content owners), each content owner still must produce multiple fingerprints of its content. Moreover, such a simple fingerprinting scheme can "lock" both content aggregators and content owners to a single fingerprint vendor, thereby making switching costs very high.

In another aspect of the invention, an "intermediate" form—a summary or digest—of the content may be provided by the content owners and used by the content aggregators to build fingerprints of the content (using their own [proprietary] fingerprint algorithms). Such a scheme obviates the need for content owners to create multiple fingerprints of their content (i.e., one for each content aggregator), while still allowing content owners to keep in their possession the original, pristine versions of their content.

Using this approach, a content owner obfuscates its content in a way that makes it impossible to regain what has been lost (i.e., the original and pristine content can not be built from the obfuscated version), and then makes the obfuscated version available to the content aggregators along with "instructions" on how they can transform their content in a similar manner. With these two pieces of information, content aggregators can determine, using fingerprints generated from their own algorithms (i.e., running their fingerprint algorithms on both the transformed content provided by the content owners, and their own content, as transformed per the content owner's instructions), whether the content they possess is not theirs to distribute and share.

It will be appreciated that the manner in which the original content is obfuscated is not critical to the invention, and that each approach has its advantages and disadvantages. For example, with video, the pixel existing at a particular position in the video stream may be saved for each frame of video (i.e., the bulk of the video is disregarded); such a scheme satisfies the constraint that the intermediate digest be unusable to an end user (i.e., no end user could get anything meaningful from a single-pixel video). However, a disadvantage to this method is that it may be circumvented by simply modifying the particular pixel in some manner (e.g., setting it to black, etc.), which would alter any resultant fingerprint and thus frustrate any attempt to match it to other fingerprints.

Another example is to encrypt the content with a one-way hash, which generally requires both primes to invert it. In such a scenario, the content owners may put the content through the one-way hash and then require content aggregators to do the same (using the public prime in a public-key encryption technique). However, this approach also has a disadvantage in that relatively small changes to the content will dramatically change the hash function and ultimately render the fingerprint distinct (i.e., it will not match). Another disadvantage of the hash technique is that it turns the content into something that is generally unrecognizable and useless to some fingerprint algorithms, such as, for example, the color histogram method detailed above.

In light of the above examples of intermediate digests, it will be appreciated that a robust intermediate digest generally will contain a mixture of the original content, but obfuscated in a way that no person would be able to consume it. As is known, there are numerous ways of doing this, including, for example, combining temporal and spatial sampling. In the context of video, an option may be to publish an intermediate digest that contains one frame of video for every second of video (generally 24-30 frames) in the original media. Similarly, with audio, an intermediate digest may contain a 50 millisecond audio clip for every second of audio. The content contained in both of these intermediate digests, audio and video, is crucial to the experience of the original content, yet does not give away so much of the content as to allow someone to recreate the original (each of these intermediate digests accounts for roughly $\frac{1}{25}^{th}$ of the original content).

Figure 3:
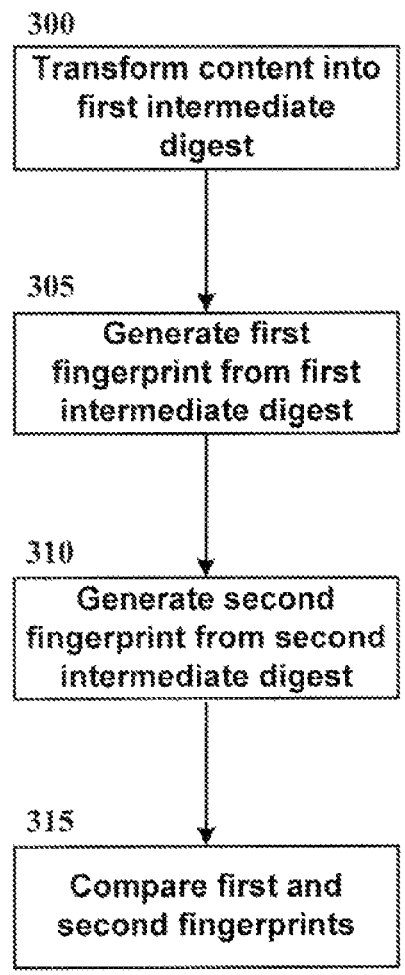
FIG. 3 is a logical flowchart of the general process by which a content aggregator may check its content against various content owners' content repositories using an intermediate digest of the content.

FIG. 3 is a logical flowchart of the general process by which a content aggregator may check its content against various content owners' content using an intermediate digest of the content. At block 300, a content aggregator transforms its content into an intermediate digest using a process defined by a content owner. The content aggregator then generates a fingerprint from the intermediate digest, using its own [proprietary] fingerprint algorithm, as illustrated at block 305. As shown at block 310, and using an intermediate digest provided by the content owner, the content aggregator generates another fingerprint using its own algorithm (i.e., the same algorithm used for the initial fingerprint). At block 315, the content aggregator compares the two fingerprints to see if they match.

The sequence and numbering of blocks depicted in FIGS. 2 and 3 is not intended to imply an order of operations to the exclusion of other possibilities. Those of skill in the art will appreciate that the foregoing systems and methods are susceptible of various modifications and alterations.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:
1. A method comprising:
receiving, from a plurality of end-users of a content aggregator, by the content aggregator, a plurality of content items;
the content aggregator allowing a second plurality of end-users to access the plurality of content items;

receiving, from an end-user, at the content aggregator, a particular content item;
generating, by the content aggregator, a first fingerprint of the particular content item;
retrieving, by the content aggregator, a first owner-provided fingerprint that is generated by a first content owner;
determining, by the content aggregator, whether the first fingerprint matches the first owner-provided fingerprint;
generating, by the content aggregator, a second fingerprint of the particular content item, wherein the second fingerprint is different than the first fingerprint;
retrieving, by the content aggregator, a second owner-provided fingerprint that is generated by a second content owner that is different than the first content owner; and
determining, by the content aggregator, whether the second fingerprint matches the second owner-provided fingerprint;
determining that the particular content item is illegal content based at least in part on a determination that the first fingerprint matches the first owner-provided fingerprint or the second fingerprint matches the second owner provided fingerprint;
wherein the method is performed by one or more machines.

2. The method of claim 1, wherein the first owner-provided fingerprint is retrieved by the content aggregator through a web service provided by the first content owner.

3. The method of claim 1, wherein the first owner-provided fingerprint is generated using one of:
(i) a fingerprint algorithm defined by the content aggregator; or
(ii) a fingerprint algorithm defined by the first content owner.

4. The method of claim 1, wherein the first owner-provided fingerprint is associated with fingerprint data that indicates information about a corresponding content item for which the first owner-provided fingerprint was generated.

5. The method of claim 4, wherein the fingerprint data contains at least one item of information selected from a group consisting of:
a title of the corresponding content item;
a runtime of the corresponding content item;
a size of the corresponding content item;
contact information of the first content owner; and
a description of a fingerprint algorithm used to create the first owner-provided fingerprint.

6. The method of claim 1, further comprising:
generating, by the content aggregator, a third fingerprint of a second content item that is included in the plurality of content items;
retrieving, by the content aggregator, through a service provided by a third content owner, a fourth fingerprint that is generated by the third content owner;
converting the third fingerprint to a fifth fingerprint;
determining whether the fifth fingerprint matches the fourth fingerprint.

7. A method comprising:
receiving, from a plurality of end-users of a content aggregator, by the content aggregator, a plurality of content items;
the content aggregator allowing a second plurality of end-users to access the plurality of content items;
receiving, from an end-user, at the content aggregator, a particular content item;
transforming, by the content aggregator using a particular technique, the particular content item into a first intermediate digest, wherein the first intermediate digest is an obfuscated version of the particular content item;
generating, by the content aggregator, a first fingerprint from the first intermediate digest using a fingerprint algorithm;
receiving, by the content aggregator, from a content owner, a second intermediate digest that is an obfuscated version of a content item;
generating, by the content aggregator, a second fingerprint from the second intermediate digest using the fingerprint algorithm; and
comparing the first fingerprint with the second fingerprint;
determining that the particular content item is illegal content based at least in part on a determination that the first fingerprint matches the second fingerprint; wherein the method is performed by one or more machines.

8. The method of claim 7, wherein said transforming comprises a combination of spatial and temporal sampling.

9. The method of claim 7, wherein the second intermediate digest is made available to the content aggregator through a service provided by the content owner.

10. The method of claim 9, wherein the service is a web service.

11. The method of claim 7, wherein the particular technique is a technique that is selected by the content owner.

12. The method of claim 7, wherein:
the content owner is a first content owner;
the method further comprising:
transforming, by the content aggregator using a second technique, the particular content item into a third intermediate digest;
generating, by the content aggregator, a third fingerprint from the third intermediate digest using the fingerprint algorithm;
receiving, by the content aggregator, from a second content owner that is different than the first content owner, a fourth intermediate digest;
generating, by the content aggregator, a fourth fingerprint from the fourth intermediate digest using the fingerprint algorithm; and
comparing the third fingerprint with the fourth fingerprint.

13. The method of claim 12, wherein the second technique is different than the particular technique.

14. The method of claim 7, wherein:
the content owner is a first content owner;
the plurality of content items includes a second content item that is different than the particular content item; and
the method further comprising:
transforming, by the content aggregator using a second technique, the second content item into a third intermediate digest;
generating, by the content aggregator, a third fingerprint from the third intermediate digest using the fingerprint algorithm;
receiving, by the content aggregator, from a second content owner that is different than the first content owner, a fourth intermediate digest;
generating, by the content aggregator, a fourth fingerprint from the fourth intermediate digest using the fingerprint algorithm; and
comparing the third fingerprint with the fourth fingerprint.

15. The method of claim 7, further comprising:
retrieving, by the content aggregator, an executable program from the content owner;

wherein transforming the particular content item into the first intermediate digest comprises executing the executable program.

16. The method of claim 1, wherein:
the plurality of content items includes a second content item that is different than the particular content item; and
the method further comprising:
generating, by the content aggregator, a third fingerprint of the second content item;
retrieving, by the content aggregator, through a service provided by a third content owner, a fourth fingerprint that is generated by the third content owner; and
determining, by the content aggregator, whether the third fingerprint matches the fourth fingerprint.

17. The method of claim 1, wherein:
the particular content item comprises audio data;
generating the first fingerprint comprises computing a spectrogram based on the audio data, wherein the first fingerprint is based on an analysis of the spectrogram.

18. The method of claim 1, wherein:
the particular content item comprises video data;
generating the first fingerprint is based on a color histogram of the video data.

19. The method of claim 1,
the method further comprising:
retrieving, by the content aggregator, through a service provided by a third content owner that is different than the first content owner, a third fingerprint that is generated by the third content owner; and
determining, by the content aggregator, whether the first fingerprint matches the third fingerprint.

20. The method of claim 1, wherein:
generating the first fingerprint is based on a first fingerprint algorithm; and
generating the second fingerprint is based on a second fingerprint algorithm that is different than the first fingerprint algorithm.

21. A system comprising:
a content aggregator, executing on one or more computing devices, that is configured to: receive content items from end-users; and
allow end-users to access the content items;
wherein the content aggregator is further configured to determine whether content items that are received from end-users are illegal by executing a method that comprises:
receiving, from an end-user, a particular content item;
generating, by the content aggregator, a first fingerprint of the particular content item;
retrieving a first owner-provided fingerprint that is generated by a first content owner;
determining whether the first fingerprint matches the first owner-provided fingerprint;
generating, by the content aggregator, a second fingerprint of the particular content item, wherein the second fingerprint is different than the first fingerprint;
retrieving a second owner-provided fingerprint that is generated by a second content owner that is different than the first content owner; and
determining whether the second fingerprint matches the second owner-provided fingerprint; and
determining that the particular content item is illegal content based at least in part on a determination that the first fingerprint matches the first owner-provided fingerprint or the second fingerprint matches the second owner provided fingerprint.

22. The system of claim 21, wherein the content aggregator is configured to retrieve the first owner-provided fingerprint through a web service provided by the first content owner.

* * * * *